(12) United States Patent
Matte et al.

(10) Patent No.: US 9,478,108 B2
(45) Date of Patent: Oct. 25, 2016

(54) MULTI-DIRECTIONAL, MULTI-FUNCTIONAL, WEARABLE SAFETY LIGHTING APPARATUS

(71) Applicant: Archangel Device LLC, Milwaukee, WI (US)

(72) Inventors: Kevin D. Matte, Milwaukee, WI (US); Ronald R. Dir, Sturtevant, WI (US); Chad J. Stillman, Burlington, WI (US)

(73) Assignee: Archangel Device LLC, Milwaukee, WI (US)

( * ) Notice: Subject to any disclaimer, the term of this patent is extended or adjusted under 35 U.S.C. 154(b) by 0 days.

(21) Appl. No.: 14/295,935

(22) Filed: Jun. 4, 2014

(65) Prior Publication Data

US 2014/0285355 A1    Sep. 25, 2014

Related U.S. Application Data

(63) Continuation-in-part of application No. 13/676,549, filed on Nov. 14, 2012, now Pat. No. 8,917,187, which is a continuation of application No. 12/612,632, filed on Nov. 4, 2009, now abandoned.

(60) Provisional application No. 61/113,117, filed on Nov. 10, 2008.

(51) Int. Cl.
| | |
|---|---|
| *G08B 5/22* | (2006.01) |
| *G08B 5/36* | (2006.01) |
| *G01S 1/70* | (2006.01) |
| *G08B 5/00* | (2006.01) |
| *H05B 37/00* | (2006.01) |
| *F21V 21/08* | (2006.01) |
| *F21V 21/084* | (2006.01) |
| *H04N 5/77* | (2006.01) |

(52) U.S. Cl.
CPC . *G08B 5/36* (2013.01); *G01S 1/70* (2013.01); *G08B 5/004* (2013.01)

(58) Field of Classification Search
USPC ............... 340/815.45, 815.4, 815.74, 908
See application file for complete search history.

(56) References Cited

U.S. PATENT DOCUMENTS

| | | | |
|---|---|---|---|
| 4,047,165 A | 9/1977 | Andreasson et al. | |
| 4,319,309 A | 3/1982 | Benoit | |
| 4,328,533 A | 5/1982 | Paredes | |
| 4,837,559 A | 6/1989 | Green, Sr. | |

(Continued)

OTHER PUBLICATIONS

QuiqLite, Products page, http://quiqlite.com/products/, 2013, printed Apr. 18, 2016.

*Primary Examiner* — Jack K Wang
(74) *Attorney, Agent, or Firm* — Husch Blackwell LLP

(57) ABSTRACT

A multi-functional, multi-directional wearable safety lighting device is disclosed herein that includes a main light housing and a magnetic mounting assembly coupleable to a bottom surface of the main light housing. The mounting assembly is configured to secure the wearable safety lighting device to a user. The main light housing includes warning light elements coupled front and rear side surfaces. A directional work light is coupled to the front side surface of the main housing and is distinct from the warning light elements. A power source supplies power to the warning light elements and the work light. A controller is programmed to energize the warning light elements in select subgroups following depression of a first control button or a second control button, and energize the directional work light following depression of a third control button.

19 Claims, 13 Drawing Sheets

(56) References Cited

U.S. PATENT DOCUMENTS

| | | | |
|---|---|---|---|
| 4,999,753 A | 3/1991 | MacKenzie | |
| D340,777 S | 10/1993 | Choi et al. | |
| 5,434,759 A | 7/1995 | Endo et al. | |
| 5,627,513 A | 5/1997 | Weed et al. | |
| 5,652,570 A | 7/1997 | Lepkofker | |
| 5,806,965 A | 9/1998 | Deese | |
| 5,905,441 A | 5/1999 | Klee et al. | |
| 5,963,126 A | 10/1999 | Karlin et al. | |
| 6,137,396 A | 10/2000 | Puppo | |
| 6,461,015 B1 | 10/2002 | Welch | |
| 6,486,797 B1 | 11/2002 | Laidman | |
| D486,932 S | 2/2004 | Dario et al. | |
| D511,984 S | 11/2005 | Kumagai | |
| 7,021,783 B2 | 4/2006 | Quittner | |
| D520,395 S | 5/2006 | Lazalier | |
| 7,306,348 B2 | 12/2007 | Quittner | |
| 7,497,584 B1 | 3/2009 | Quittner | |
| 7,736,015 B2 * | 6/2010 | Coushaine | F21L 4/02 362/202 |
| 7,862,193 B1 | 1/2011 | Quittner | |
| 7,984,998 B1 | 7/2011 | Quittner | |
| 8,282,233 B2 | 10/2012 | Quittner | |
| 2003/0132852 A1 | 7/2003 | Povey et al. | |
| 2004/0207532 A1 * | 10/2004 | Smithson | G08B 5/38 340/643 |
| 2005/0068777 A1 * | 3/2005 | Popovic | B60Q 1/2611 362/307 |
| 2006/0028814 A1 * | 2/2006 | Smith | B60Q 1/2607 362/227 |
| 2006/0104054 A1 * | 5/2006 | Coman | F21S 9/022 362/153.1 |
| 2006/0132323 A1 * | 6/2006 | Grady | G08B 5/36 340/815.45 |
| 2007/0113845 A1 | 5/2007 | O'Brien et al. | |
| 2007/0176784 A1 | 8/2007 | Fautin et al. | |
| 2007/0194048 A1 | 8/2007 | Teig | |
| 2007/0200716 A1 * | 8/2007 | Haase | G08B 15/004 340/574 |
| 2008/0088477 A1 | 4/2008 | Martin et al. | |
| 2008/0094822 A1 * | 4/2008 | Hsu | F21V 33/0056 362/102 |
| 2008/0130272 A1 | 6/2008 | Waters | |
| 2008/0247161 A1 | 10/2008 | Hulsey et al. | |
| 2008/0259601 A1 | 10/2008 | Frank et al. | |
| 2008/0319282 A1 | 12/2008 | Tran | |
| 2009/0135595 A1 * | 5/2009 | Chen | F21K 9/135 362/235 |
| 2009/0179750 A1 * | 7/2009 | Jachmann | B60Q 7/00 340/473 |
| 2009/0251917 A1 * | 10/2009 | Wollner | B60Q 3/004 362/543 |
| 2010/0027249 A1 * | 2/2010 | Connor | F21L 4/08 362/183 |
| 2010/0177503 A1 * | 7/2010 | Lau | F21L 4/08 362/105 |
| 2011/0210685 A1 * | 9/2011 | Liao | H05B 37/02 315/313 |
| 2014/0362561 A1 * | 12/2014 | Faircloth | G02C 11/04 362/103 |

\* cited by examiner

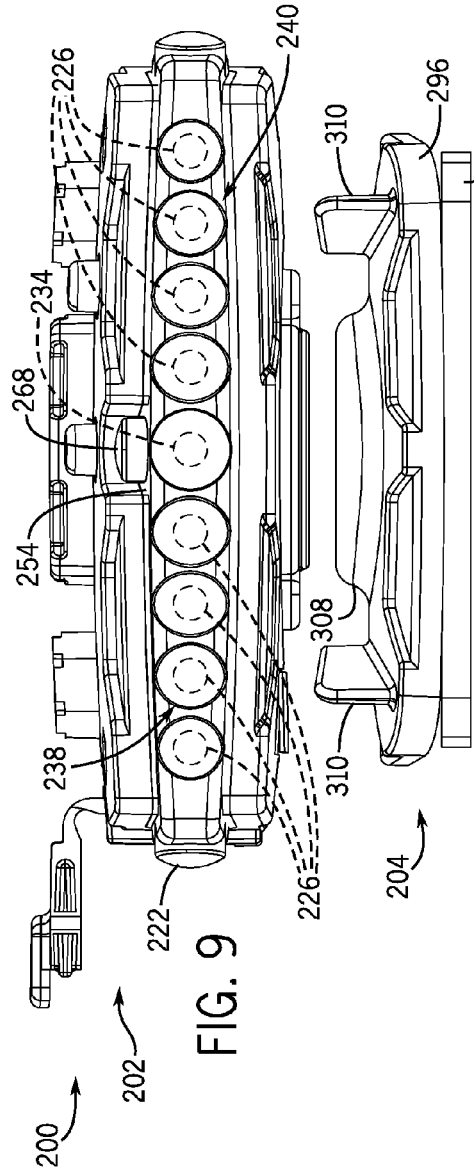
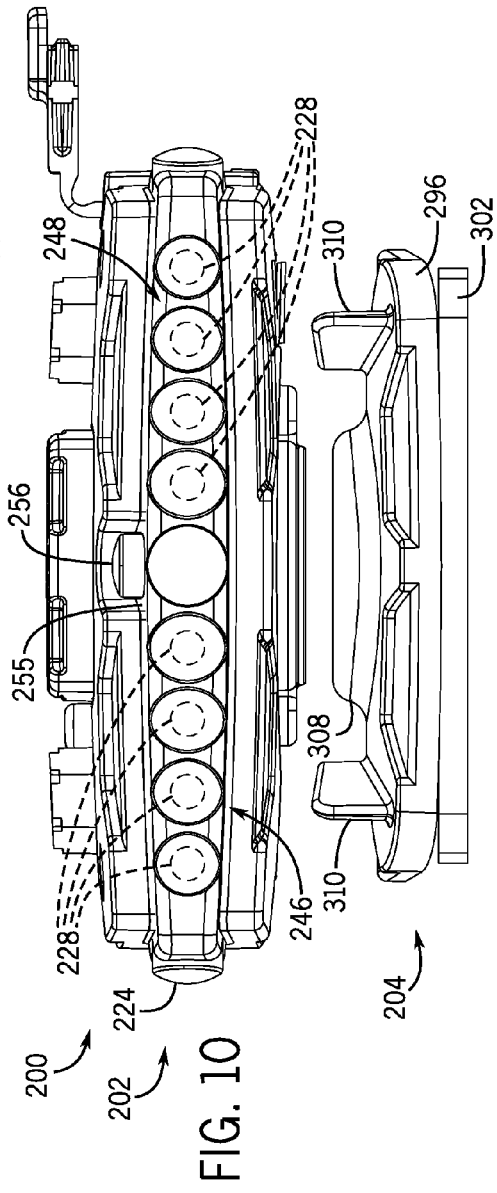
FIG. 9
FIG. 10

MULTI-DIRECTIONAL, MULTI-FUNCTIONAL, WEARABLE SAFETY LIGHTING APPARATUS

CROSS-REFERENCE TO RELATED APPLICATIONS

The present application is a continuation-in-part of and claims priority to U.S. application Ser. No. 13/676,549 filed on Nov. 14, 2012, which is a continuation of and claims priority to U.S. application Ser. No. 12/612,632 filed on Nov. 4, 2009, which is a non-provisional of and claims priority to U.S. Provisional Application No. 61/113,117 filed on Nov. 10, 2008, the disclosures of which are incorporated herein by reference.

FIELD OF INVENTION

The present invention relates generally to the field of safety and warning indicators and specifically to multifunctional beaconing devices for safety personnel.

BACKGROUND

Safety personnel such as law enforcement officers, firefighters, medical personnel, military personnel, and security personnel are frequently involved in situations where they must leave their vehicle or where they interact directly with crowds and the public. The vehicles used by safety personnel are generally equipped with audible and visual alarms, safety devices and tracking devices. Once an individual has left their vehicle, however, they may be unable to readily access these features.

Construction personnel and workers in the transportation or power industries frequently encounter similar safety issues when operating in their day-to-day jobs. Construction personnel, such as those operating on large job sites or on transportation projects, for example, work outdoors in areas with high vehicle traffic or amongst large pieces of motorized equipment. Airport personnel, crossing guards, and the employees of highway crews and tow companies perform their jobs on foot in high-traffic areas and often in low-light or nighttime situations.

To improve visibility when working in low light or nighttime conditions away from their vehicles, construction and safety personnel often wear clothing or other accessories made with florescent or reflective fabric and carry flashlights. Wearing such reflective clothing may prove a hindrance to law enforcement or military personal in covert situations. Also, these devices provide limited or no added visability during daylight hours in highly populated areas or in crowd control situations. These devices also do not permit the user to be identified or located from a distance. Further, in the case of flashlight-type devices, the device may serve to hinder the user in an emergency situation and slow the user in performing work-related tasks, since the device occupies one of the user's hands when in use.

In such situations, it would be desirable for safety personnel to have a multi-functional device that can be carried on his or her person, provide a hands free source of light, and which affords the user improved visability when outside his or her vehicle in populated or high traffic areas, regardless of the time of day or level of ambient light. It would also be desirable for such a device to provide enhanced visibility of the user in multiple directions.

BRIEF DESCRIPTION OF THE INVENTION

Embodiments of the invention disclosed herein include a securely attached portable, wearable device to enhance safety, visibility and communication capability of safety personnel when such personal leave their vehicles. The device provided is configured to be securely attached to the wearer, and is capable of emitting variable visual and audio signals actuated by a control panel component which is designed so that the user can activate various options of visual and audio signals while in flight. The device may further include GPS capability for tracking, activation and deactivation functions.

In accordance with one aspect of the invention, a wearable safety lighting device includes a main housing having a top surface, a bottom surface, and a plurality of side surfaces and a mounting assembly coupleable to the bottom surface of the main housing. The mounting assembly is configured to secure the wearable safety lighting device to a user. A first plurality of warning light elements is coupled to a front side surface of the main housing, a directional work light is coupled to the front side surface of the main housing and distinct from the first plurality of warning light elements, and a second plurality of warning light elements is coupled to a rear side surface of the main housing. A power source is configured to supply power to the first and second plurality of warning light elements and the directional work light and a controller is programmed to energize the first plurality of warning light elements following depression of a first control button, energize the second plurality of warning light elements following depression of a second control button, and energize the directional work light following depression of a third control button.

In accordance with another aspect of the invention, a wearable safety lighting apparatus includes a main light assembly having a rechargeable power source disposed within a housing and a first light assembly engaged between a top portion and a bottom portion of the housing, the first light assembly comprising a first plurality of light components and a work light component. The main light assembly also includes a second light assembly engaged between the top portion and the bottom portion of the housing, the second light assembly comprising a second plurality of light components. A plurality of switches are configured to selectively energize the first plurality of light components, the second plurality of light components, and the work light component to cause visual signals to emit therefrom and a first magnet coupled to the bottom portion of the housing. The wearable safety lighting apparatus also includes a mounting assembly comprising a second magnet positioned to align with the first magnet to secure the wearable safety lighting apparatus through clothing of a user.

In accordance with a further aspect of the invention, a wearable safety lighting apparatus includes a multi-functional light assembly having a plurality of light components configured to emit visual signals in multiple directions and a first magnetic component secured to a bottom surface of the multifunctional light assembly. A mounting assembly is coupleable to the multi-functional light assembly via a second magnetic component secured to a top surface of the mounting assembly.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 9 is a front elevational view of the wearable safety lighting apparatus of FIG. 5 arranged in a disengaged position.

FIG. 10 is a rear elevational view of the wearable safety lighting apparatus of FIG. 5 arranged in the disengaged position.

DETAILED DESCRIPTION

Figure 1:
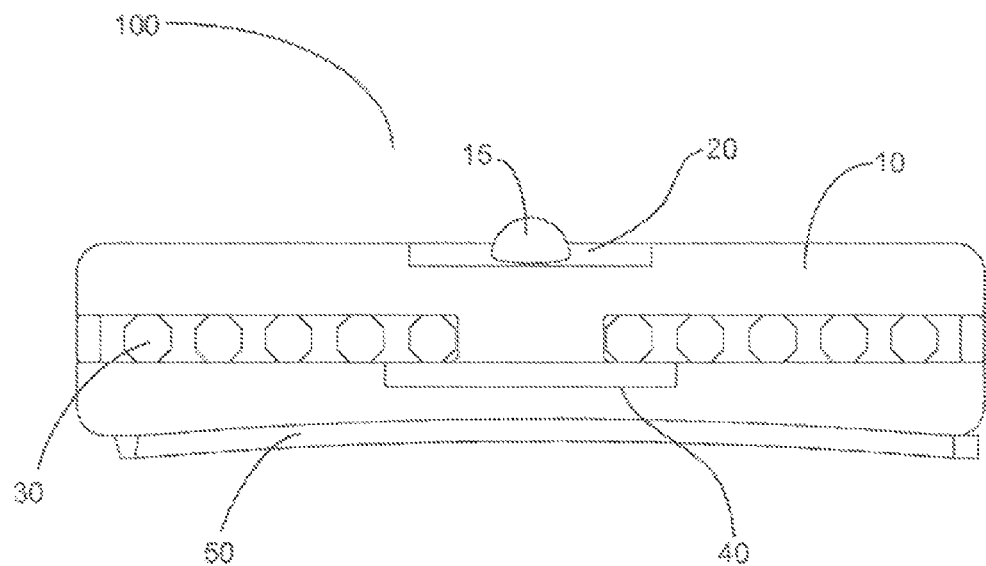
FIG. 1 illustrates a side view of one embodiment of a flare device apparatus.

For the purpose of promoting an understanding of the present invention, references are made in the text hereof to embodiments of a personal security alert device for safety personnel, only some of which are described herein. It should nevertheless be understood that no limitations on the scope of the invention are thereby intended. One of ordinary skill in the art will readily appreciate that modifications, such as the dimensions of a personal security alert device for safety personnel and use of alternate but functionally similar material(s), may be made. The inclusion of additional elements may be deemed readily apparent and obvious to one of ordinary skill in the art, and all equivalent relationships to those described in the written description do not depart from the spirit and scope of the present invention. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitative representation that could permissibly vary without resulting in a change in the basic function to which it is related. For example, one embodiment of the flare device disclosed herein may be comprised of a single multi-dimensional and/or textured component, while others may include multiple multi-dimensional and/or textured components.

Referring now to the drawings, FIG. 1 shows a side view of one embodiment of flare device 100. In the embodiment shown, housing 10 is generally rectangular but may be rounded, contoured to fit the curve of a shoulder or any other shape. In the embodiment shown, flare device 100 is worn on the shoulder of a safety personnel user, and attached by hook-and-eye fabric, a clip, spring attachment, magnetic means or any other attachment means known in the art. For example, flare device 100 may be adapted to clip to a lapel or strap.

Visible in housing 10 is beacon aperture 15 for a beacon light component 20. In the embodiment shown, beacon light component 20 protrudes from housing 10 to enable a light to shine in a radius of 180 to 360 degrees.

Also shown in FIG. 1 are optional light components 30. In the embodiment shown, one or more light components 30 are affixed in and around the outside of housing 10. In the embodiment shown, light components 30 may be of various colors to signal different types of security situations, safety issues or types of security personal. For example, red and blue lights may identify a police officer. Red lights may be used to identify a medical alert. Orange lights may be used for mechanical/construction situations and/or personnel. Any colors, combination, or configuration of light components 30 may be used. Lights may also be used to signal an arrest or situation in which a civilian or member of the public has been detained.

In the embodiment shown in FIG. 1, housing 10 is compact, contoured and of sufficient width to encase light component 30, beacon light component 20, as well as power source 70 (not shown) and storage compartment 80 (not shown). In various embodiments, housing 10 can be rectangular oval, square, circular, or other shape which allows light component 30 to provide light in all directions, and may have flat or curved edges. Further, housing 10 may be singly molded or machined, constructed of multiple parts, made from metal, plastic or composites and may be padded and waterproof. Housing 10 must have a large enough aperture to accommodate a multi-directional beacon.

In the embodiment shown in FIG. 1, light component 30 contains a plurality of LED lamps which emit a variable visual signal and are affixed substantially 360 degrees around the outside of housing 10. It will be appreciated that in other embodiments more or less lamps may be used without departing from the scope of the invention, and may include gaps in lamp placement so as to not shine directly in the eyes of the wearer. Further, alternate embodiments of light component 30 may contain lamps of different types including fluorescent, xenon, incandescent, halogen, fiber optics, or any other lamp type known in the art.

In addition to light component 30, FIG. 1 depicts beacon light component 20, which is mounted in or against the top of housing 10. Beacon light component 20 is a high-intensity lamp which emits a variable visual signal. In the embodiment shown in FIG. 1, beacon light component 20 is a single LED lamp centrally placed on the top of housing 10 which protrudes to allow beacon light component 20 to be visible at a 180 degree radius. In other embodiments, the location and positioning of beacon light component 20 may be off-centered to allow optimal light display when activated, and may contain lamps of different types including fluorescent, xenon, incandescent, halogen, fiber optics, or any other lamp type known in the art.

In various embodiments, beacon light component 20 and light components 30 may be colored and/or activated in a coordinated scheme to distinguish a wearer in a particular profession. In certain embodiments, for example, a police officer may use blue, red and white lamps in light component 30 and use a bright white beacon light component 20, while a construction worker may use yellow and white lamps in light component 30 with a yellow beacon light component 20. Thus envisioned, particular light colors emitted from flare device 100 may be incorporated into the uniforms of various professions. In addition, flare device 100 may also emit audio signals at a user's command.

As illustrated in the embodiment in FIG. 1, control panel 40 is shown on the side of housing 10 and adjacent to light component 30. It is contemplated that control panel 40 alternatively be located on the top of housing 10, where it may be more easily activated by a moving user. In the embodiment shown, control panel 40 is a pressure sensitive interface designed for activation while in flight or situations when the wearer cannot look at buttons. In alternate embodiments, control panel 40 may be a roll bar, button or any other engagement mechanism known in the art which allows single or multiple settings, and may contain voice-activation technology and may be code activated. It is contemplated that control panel 40 may contain pattern selector 60 (not shown) to further allow ease of use.

The embodiment in FIG. 1 further includes securing mechanism 50, which is attached to the bottom of housing 10. In various embodiments, securing mechanism 50 may be a safety pin, clip, clamp, clasp, belt, snap, tie, or any other device which can be stably mounted. Securing mechanism 50 may be made from metal, plastic, fabric, composites, Velcro, straps, closures or any combination thereof and may include single or multiple parts. In the embodiment shown, securing mechanism 50 is a safety pin that stably mounts flare device 100 to a wearer's clothing.

Figure 2:
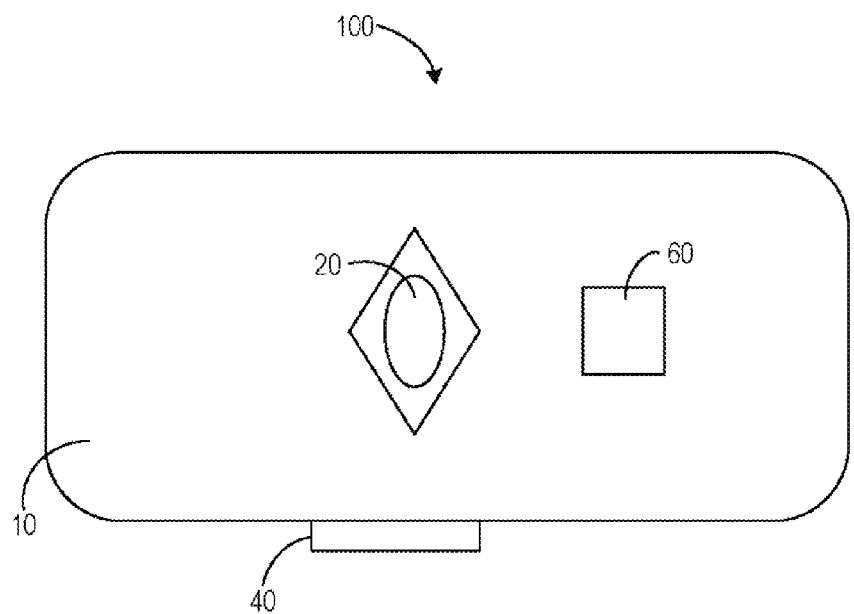
FIG. 2 illustrates a top view of one embodiment of a flare device apparatus.

FIG. 2 illustrates a top view of one embodiment of flare device 100, showing beacon light component 20 in a centrally located position. In the exemplary embodiment, pattern selector 60 is also shown on the top of housing 10. Pattern selector 60 is a pressure sensitive interface or switch that allows a user to navigate between variable visual signals.

Pattern selector 60 may enable a variety of states and settings for flare device 100. In an exemplary embodiment, variable visual signals may include a first setting or position in which all lights in the device are off. A further setting or position may activate selective (e.g., rear or front) light components 30. A further setting or position may activate front rear and side light components 30 and/or cause them to flash at designated intervals. A further setting or position may activate beacon light component 20, while yet other positions may activate all lights, beacons and other emergency features (such as signaling, photography, recording, GPS, paging, sirens, emission of chemicals, weaponry, nausea inducing light frequencies etc.).

In the embodiment shown in FIG. 2, pattern selector 60 is shown on the top of housing 10 and adjacent to beacon light component 20, but may be located anywhere on housing 10. It is contemplated that pattern selector 60 alternatively be located on the side of housing 10. Pattern selector 60 may be a switch, roll bar, button, or any other engagement mechanism known in the art that allows single or multiple settings.

Figure 3:
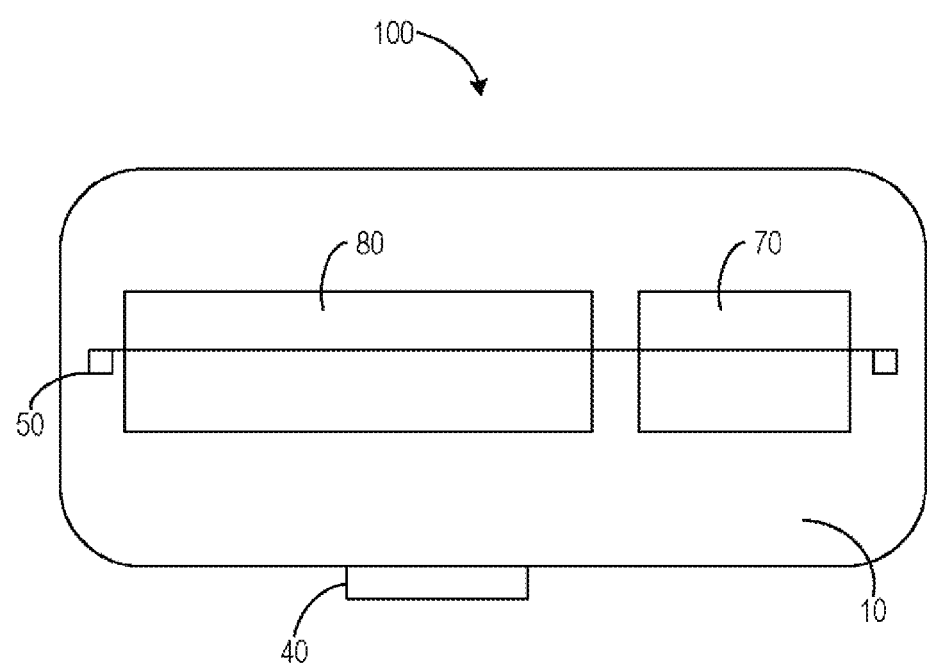
FIG. 3 illustrates a bottom view of one embodiment of a flare device apparatus.

FIG. 3 illustrates a bottom view of flare device 100, showing an exemplary securing mechanism 50. In the embodiment shown, securing mechanism 50 is a safety pin which stably mounts flare device 100 to a wearer's clothing. Also shown in the exemplary embodiment are power source 70 and storage component 80. Power source 70 provides power to light component 30 and beacon light component 20.

The exemplary embodiment shown in FIG. 3 also illustrates storage component 80 on the bottom of housing 10, where a user may store vital information such as blood type, known allergies, doctor's name, etc., in case of injury. Storage component 80 contains a lid that is held in place by a releasable retaining piece, which a user may unhook to release contents.

Referring now to FIGS. 5-19 together where appropriate, a multi-directional, multi-functional, wearable safety lighting apparatus 200 is illustrated according to another embodiment of the invention. Wearable safety lighting apparatus 200 includes a main light assembly 202 and a mounting assembly 204. As described in detail below, the two-part construction and magnetic attachment components provided within wearable safety lighting apparatus 200 permits apparatus 200 to quickly, easily, and securely be mounted on a user's shoulder through a jacket or other piece of clothing worn by the user.

Main light assembly 202 includes a main housing 206 having an upper housing portion 208 and a lower housing portion 210. In the embodiment illustrated in FIG. 5, upper and lower housing portions 208, 210 are coupled together via a plurality of screws 212. However, it is contemplated that upper and lower housing portions 208, 210 may be joined together using other fastening means, such as, for example, removable clips or adhesive in alternative embodiments.

As shown in FIG. 6 and FIGS. 9-13 in particular, a first light assembly 214 is arranged on a first or frontward-facing side 216 of wearable safety lighting apparatus 200. A second light assembly 218 is arranged on a second or rearward-facing side 220 of wearable safety lighting apparatus 200, opposite the frontward-facing side 216. Each light assembly 214, 218 includes a respective light housing 222, 224 having multiple warning light elements 226, 228, and an upward facing strobe or beacon light element 230, 232 positioned therein. Beacon light elements 230, 232 are positioned to emit visual signals in a direction facing outward from upper housing portion 208.

A central light element 234 is also provided within light housing 222. In one embodiment, the central light element 234 operates as a directional work light or task light, similar to a flashlight, and illuminates the area in front of the wearer when activated.

Light housings 222, 224 are constructed of a rigid, translucent material, such as plastic or acrylic, which permits light emitted from light elements 226, 228, 234, 230, 232 to emanate therefrom. In one embodiment, a rubberized gasket 236 forms a watertight or semi-watertight seal between light housings 222, 224, upper housing portion 208, and lower housing portion 210.

According to a preferred embodiment, light elements 226, 228, 230, 232, 234 are light emitting diodes (LEDs). The color, intensity, or type of LEDs 226, 228, 230, 232, 234 may be selected based on design specifications and application. As one example, beacon light elements 230, 232 may be configured as white LEDs having a higher intensity than light elements 226, 228, 234. As another example, light elements 226, 228, 234 may be various combinations of single color LEDs or be provided as multi-color LEDs. Any of light elements 226, 228, 230, 232, and/or 234 may be provided as a dimmable light element. As yet another example, central light element 234 may be provided as a white LED and may have a lower intensity or light output than beacon light elements 230, 232. In one embodiment, some or all of LEDs 226, 228, 230, 232, 234 are of an intensity that permits the device to be visible from a distance of over two miles.

As shown in FIG. 9, light elements 226 positioned within light housing 222 are arranged in two groups: a first group of light elements 238 and a second group of light elements 240, with the central light element 234 positioned between the first and second groups 238, 240.

Figure 11:
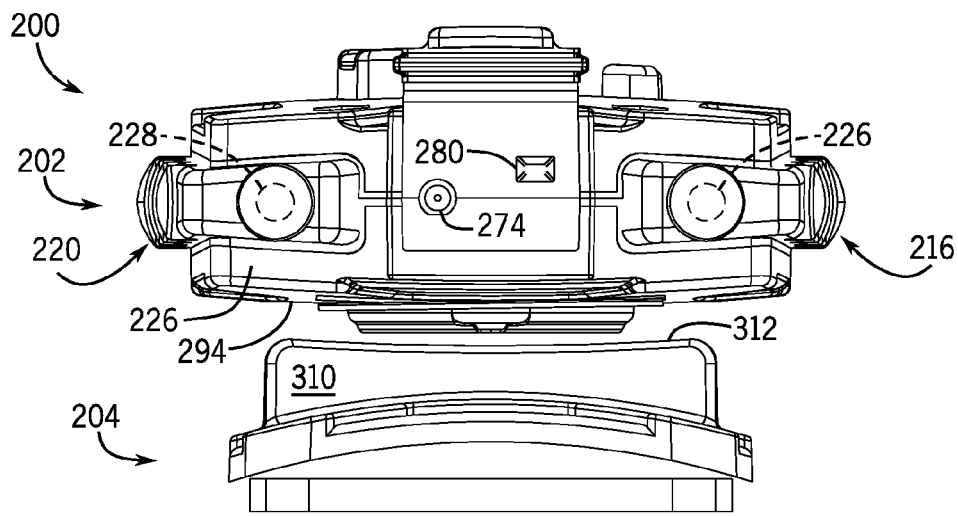
FIG. 11 is a right elevational view of the wearable safety lighting apparatus of FIG. 5 arranged in the disengaged position.

A subset of one or both of the first and second groups of light elements 238, 240 may be configured to emit visual signals outward from frontward-facing side 216, while another subset of one or both of the first and second set of light elements 238, 240 are configured to emit visual signals outward from respective leftward and rightward-facing sides 242, 244 of wearable safety lighting apparatus 200. For example, as illustrated in FIG. 11, light element 226 and light element 228 are both positioned to project light outward from rightward-facing surface 244.

Figure 12:
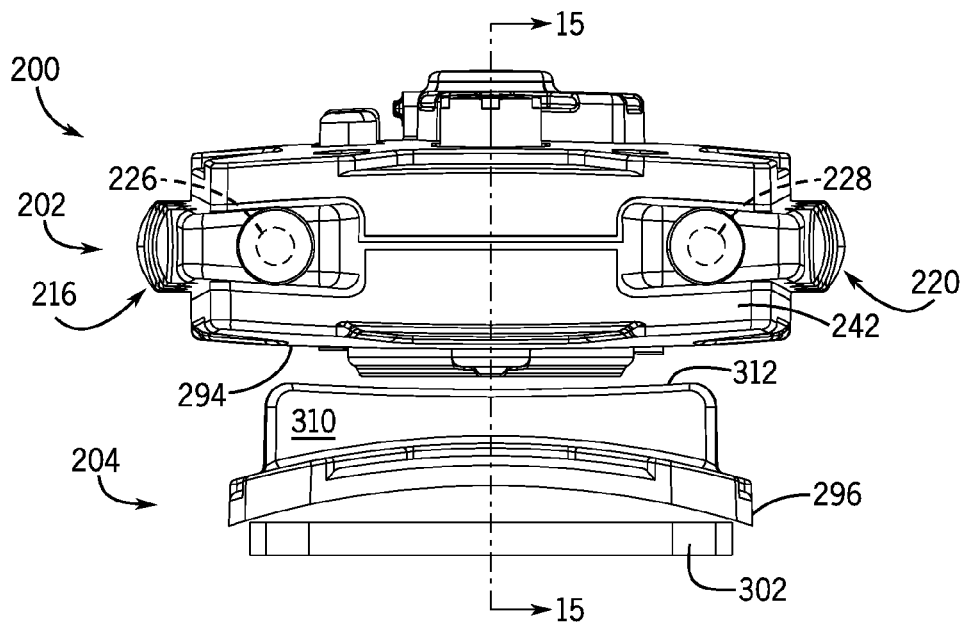
FIG. 12 is a left elevational view of the wearable safety lighting apparatus of FIG. 5 arranged in the disengaged position.

Referring now to FIG. 10, light elements 228 are arranged on the rearward-facing side 220 of wearable safety lighting apparatus 200 in two groups, referred to as herein a third group of light elements 246 and a fourth group of light elements 248. Similar to the first and second groups of light elements 238, 240, described above, the third and fourth groups of light elements 246, 248 may include light elements 228 positioned to face rearward-facing side 220, leftward facing side 242, and/or rightward-facing side 226. As shown in FIG. 12, for example, light element 226 and light element 228 are positioned to project light outward from leftward facing side 242.

While each of the four groups of light elements 238, 240, 246, 248 are described above as including one LED 226, 228, facing either the leftward side 242 or rightward side 224 of wearable safety lighting apparatus 200, it is contemplated that these side-facing LEDs may be omitted in an alternative embodiment. Alternatively, additional side-facing LEDs may be provided to extend along part or all of the respective sides 242, 244 of wearable safety lighting apparatus 200. It is contemplated that some or all of the LEDs positioned on leftward side 242 or rightward side 244 of wearable safety lighting apparatus 200 may be controlled to operate either in conjunction with light elements positioned on frontward and rearward-facing sides 216, 220 or independently therefrom.

According to alternative embodiments, the first, second, third, and fourth groups of light elements 238, 240, 246, 248 comprise LEDs of the same color, such as, for example, red, blue, green, yellow, or orange. Alternatively, the color of light elements may vary from group to group. For example, first group 238 and third group 246 may include red LEDs while second group 240 and fourth group 230 may include blue LEDs. As another example, first and second groups 238, 240 may include red LEDs while third and fourth groups 246, 248 each include blue LEDs. In a preferred embodiment, central light element 234 and beacon lights 230, 232 are configured to emit white light. However, the color of these lights may be varied according to design specifications for differing applications.

Figure 13:
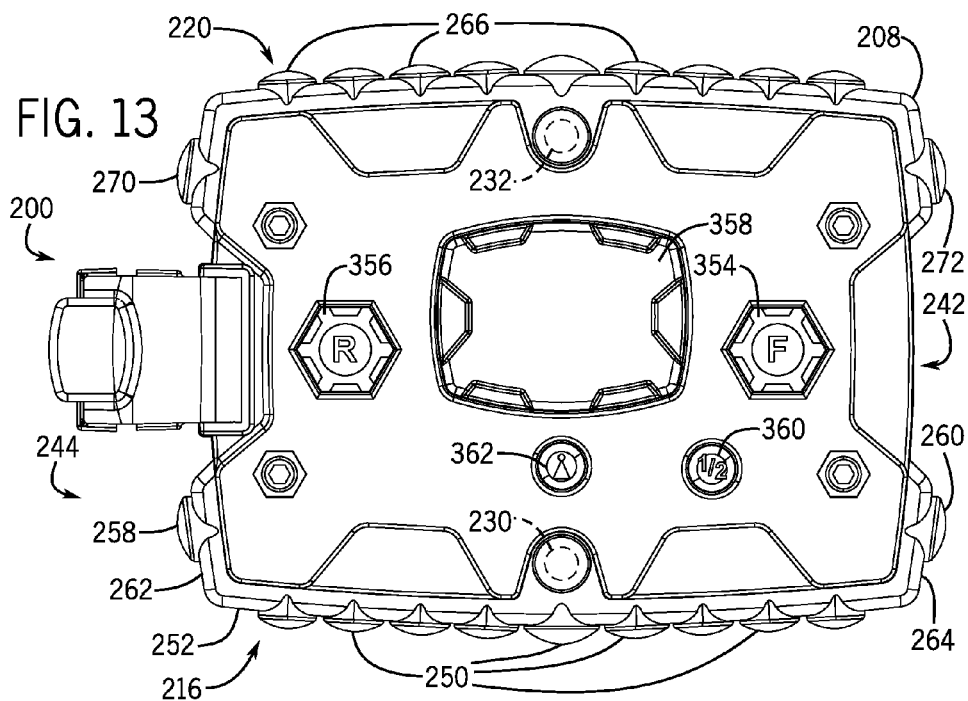
FIG. 13 is a top view of the wearable safety lighting apparatus of FIG. 5.

Referring now to FIGS. 9, 10, and 13, a plurality of projections 250 extend outward from a frontward-facing surface 252 of light housing 222. In one embodiment, these projections 250 have a generally circular face and are positioned to align with the positions of the first and second sets of light elements 226, and central light element 234 and function as lenses to amplify and direct the visual signals emitted from light elements 238, 240, 234. A top surface 254 of light housing 222 also includes a projection 268 aligned with beacon light 230. Respective projections 258, 260 are also formed on a rightward-facing surface 262 and a leftward-facing surface 264 of light housing 222 to correspond to the locations of respective LEDs 226, 228. These projections 250, 256, 258, 260 function as lenses to magnify and direct the visual signals emitted from respective light elements 226, 228, 230, 232, 234. Projections 266, 256, 270, 272 are formed on the light housing 224 in a similar manner as described above, with projection 266 aligned with light elements 240 on forward surface 200, projection 256 aligned with beacon light 232, and projections 270, 272 aligned with light elements 240 on respective rightward and leftward-facing surfaces 244, 242.

Figure 5:
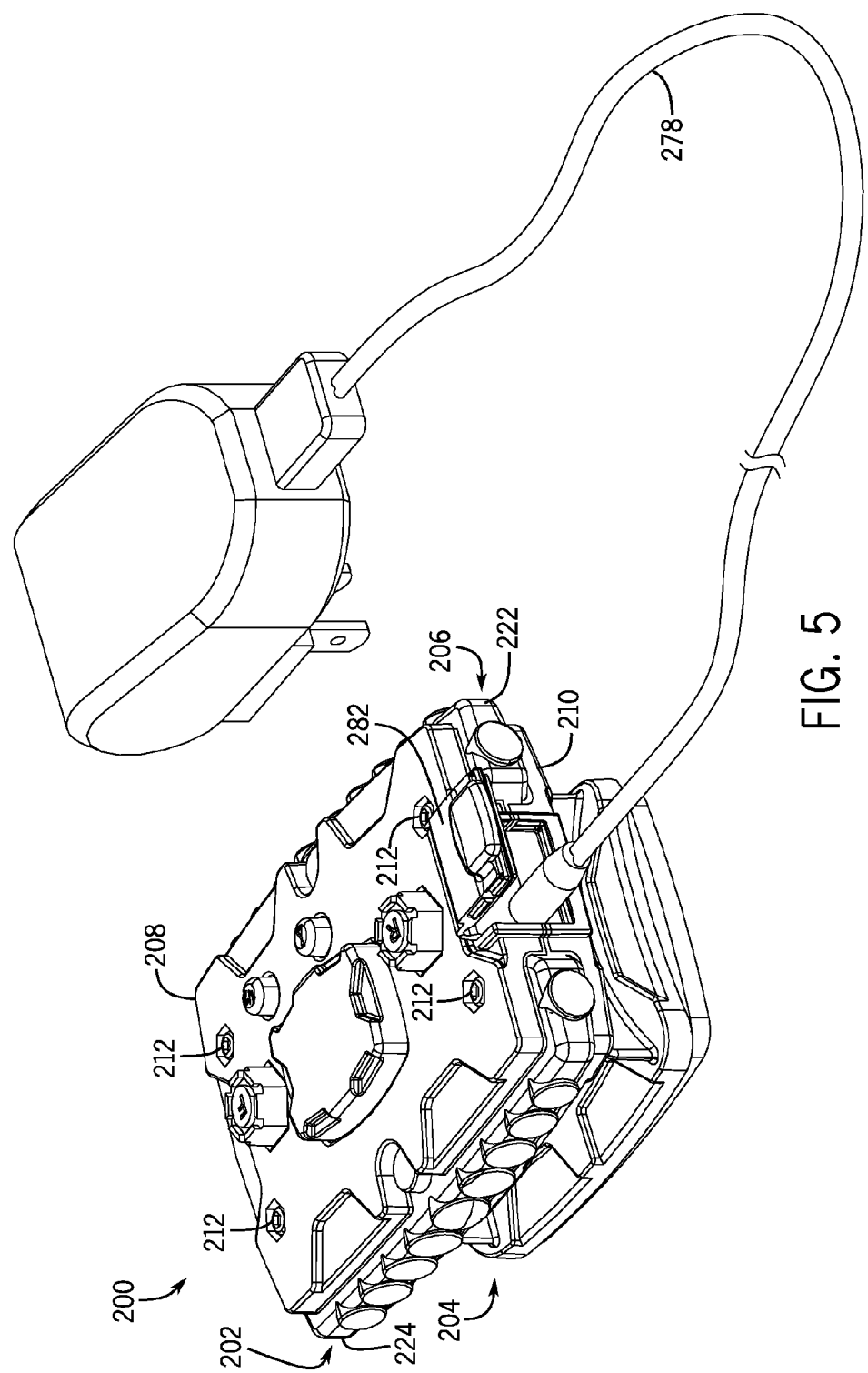
FIG. 5 illustrates a perspective view of a multi-directional, multi-functional wearable safety lighting apparatus and charging assembly according to another embodiment of the invention.
Figure 15:
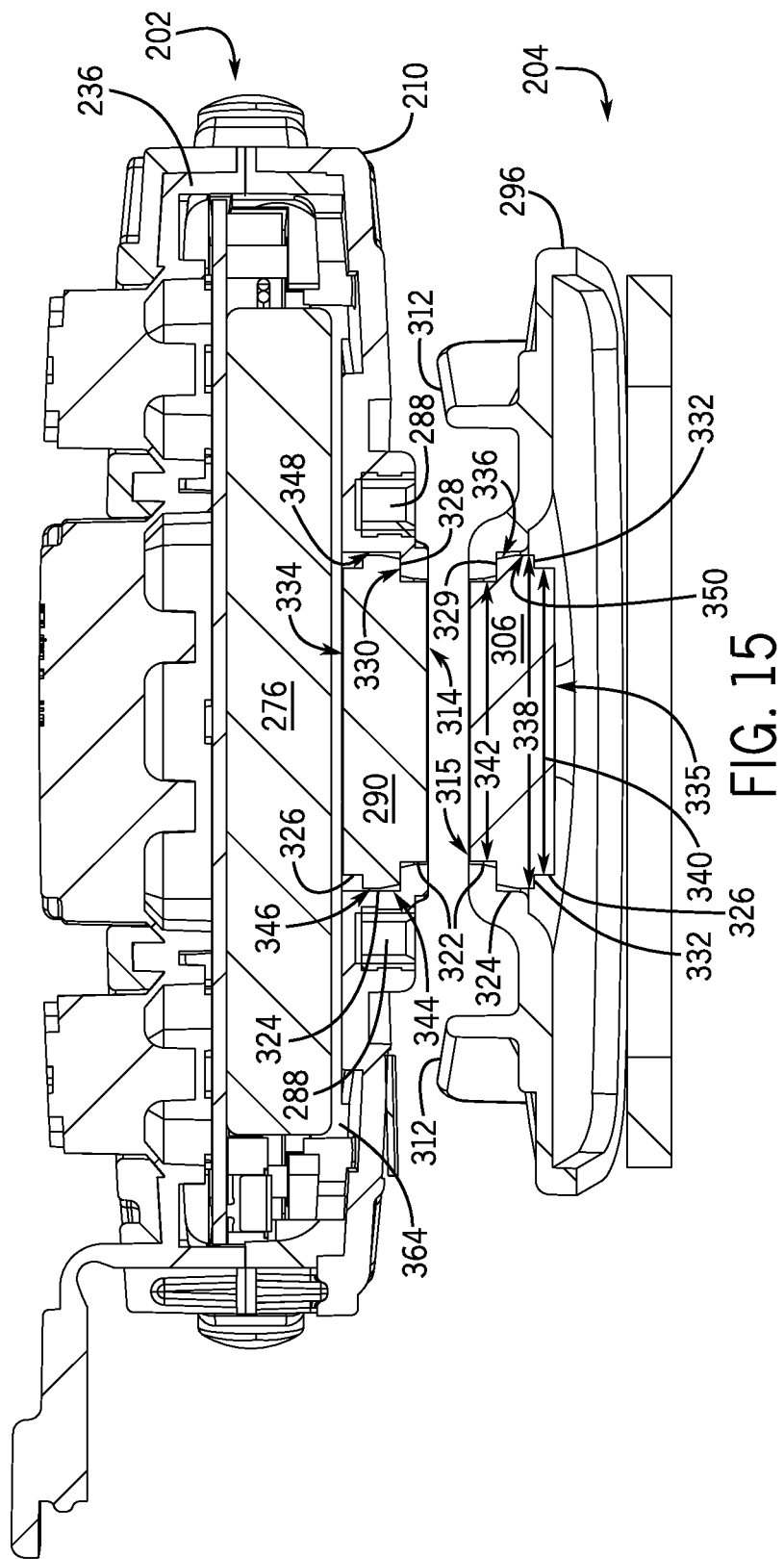
FIG. 15 is a sectional view of the wearable safety lighting apparatus of FIG. 5.
Figure 16:
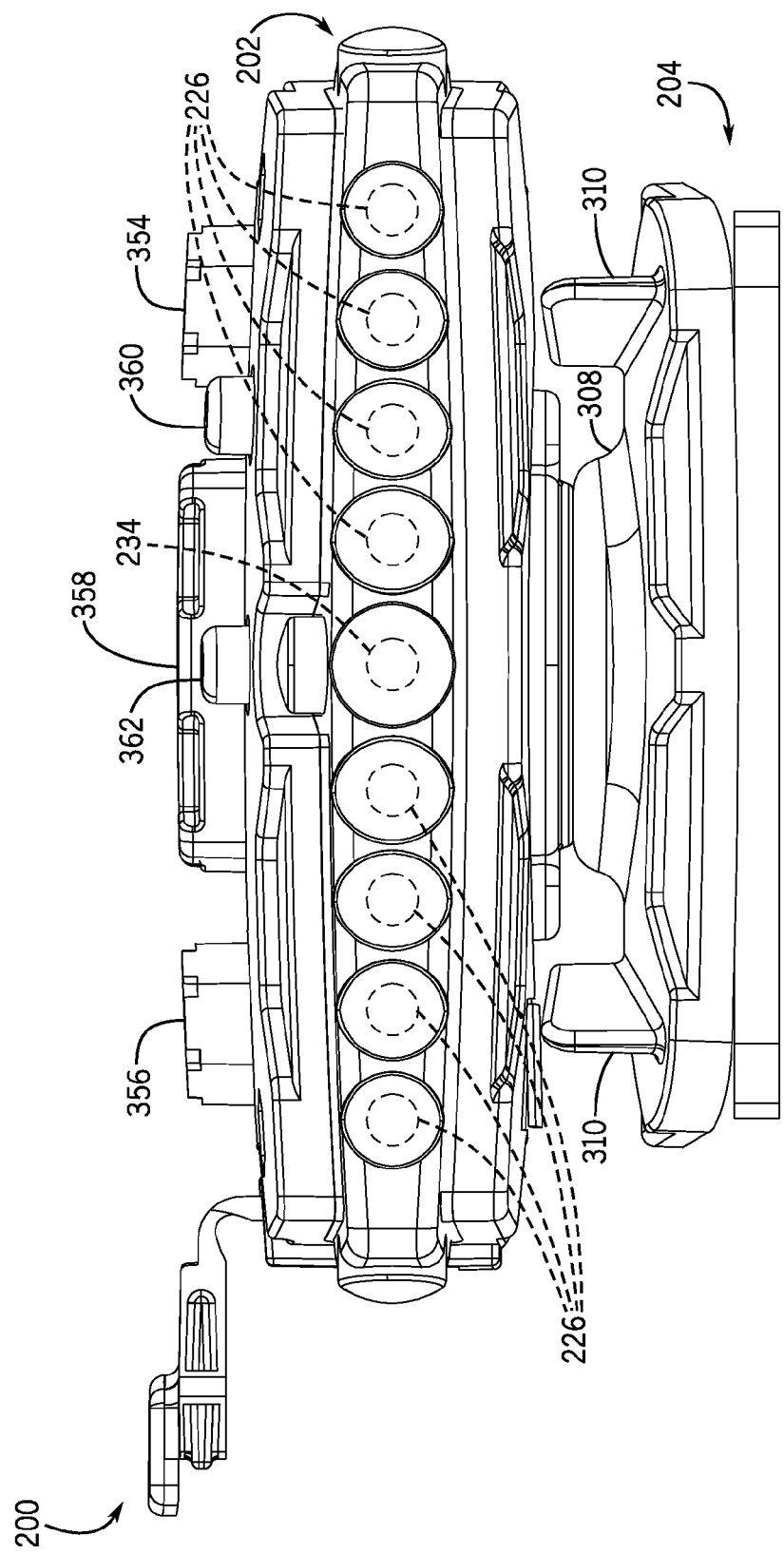
FIG. 16 is a front elevational view of the wearable safety lighting apparatus of FIG. 5 arranged in an engaged position.

Referring now to FIGS. 5, 11, and 15 in particular, a charging port 274 is provided within the main housing 206 to permit the charging of the power source 276 of the wearable safety lighting apparatus 200 by way of a power cord assembly 278. In one embodiment, power source 276 is a rechargeable battery, such as a lithium ion battery or the like. Located adjacent charging port 274 is a charge indicator light 280 that indicates the state of charge of the power source 276. In one embodiment, charge indicator light 280 is a multi-color LED that glows green to indicate a full charge and transitions to red as the state of charge of the power source 276 approaches zero. A cover 282 is attached to main housing 206 by a flexible hinge 284. The hinge 284 permits access to charging port 274 when the flexible cover 282 is in an open position, as shown in FIG. 11 for example. When flexible cover 282 is in a closed position (illustrated in FIG. 6), flexible cover 282 creates a protective seal over charging port 274, to prevent debris and moisture from entering charging port 274 when wearable safety lighting apparatus 200 is in use and not being charged. Flexible cover 282 includes a tab 286 that engages main housing 206 to retain flexible cover 282 in the closed position.

Figure 17:
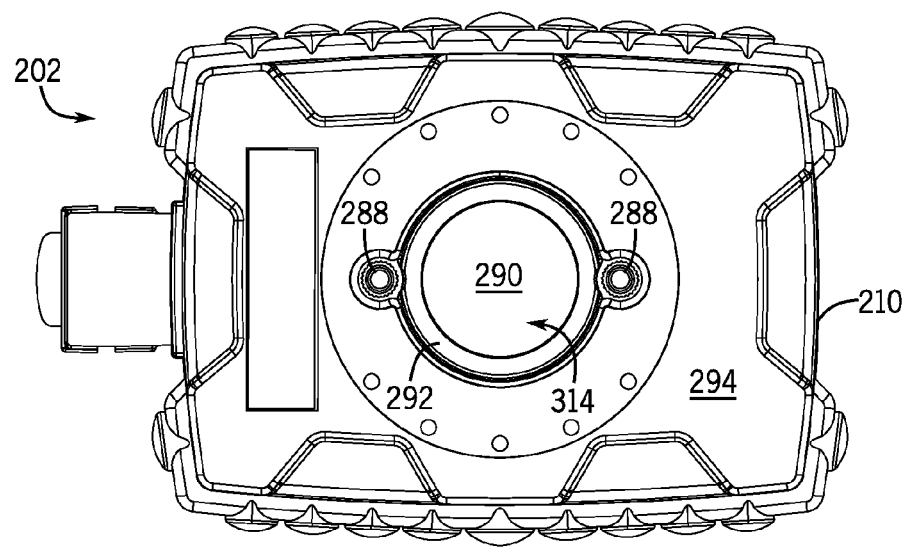
FIG. 17 is a bottom view of a main light assembly of the wearable safety lighting apparatus of FIG. 5.

As shown in FIGS. 15 and 17, lower housing portion 210 is coupled to main housing 206 by way of a plurality of fasteners 288 such as screws, for example. In alternative embodiments, lower housing portion 210 may couple to main housing 206 by a snap fit or with an adhesive. A magnet 290 is disposed within a protrusion 292 extending outwardly from a bottom surface 294 of lower housing portion 210. When assembled, a top surface 314 of magnet 290 is positioned to couple with magnetic mounting assembly 204.

Figure 4:
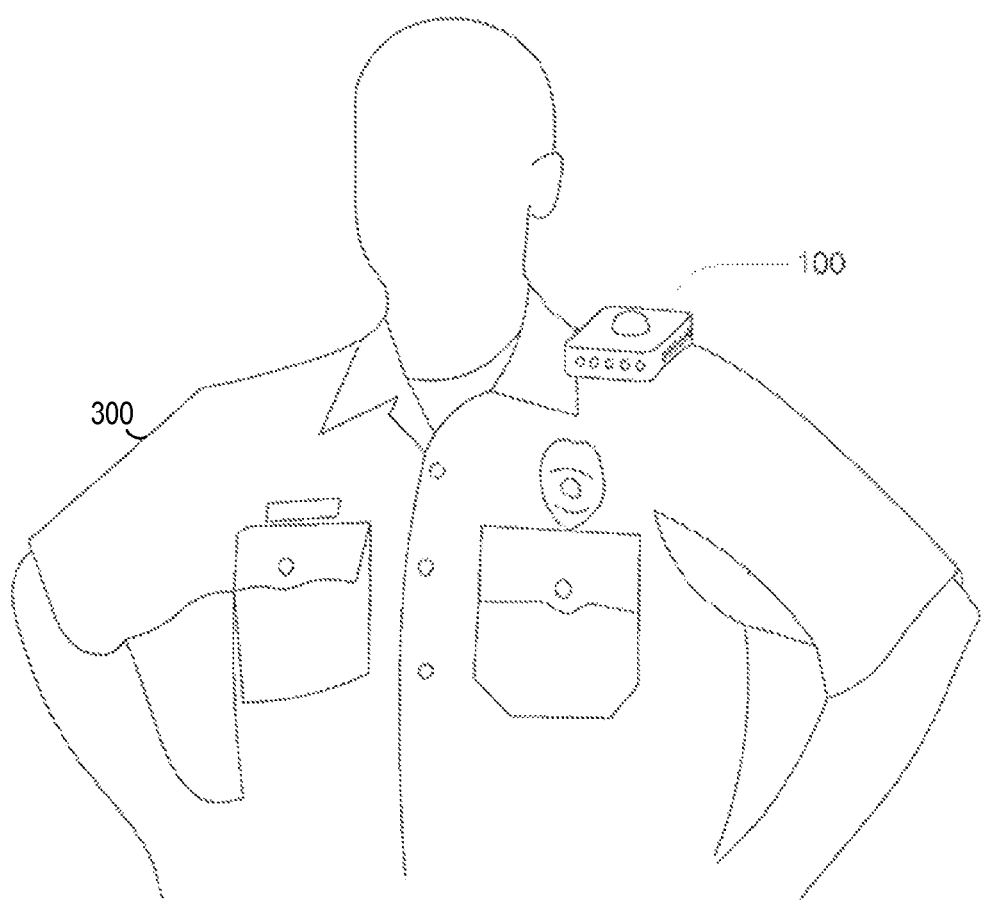
FIG. 4 illustrates one embodiment of a flare device apparatus secured to the shoulder of a safety personal.
Figure 14:
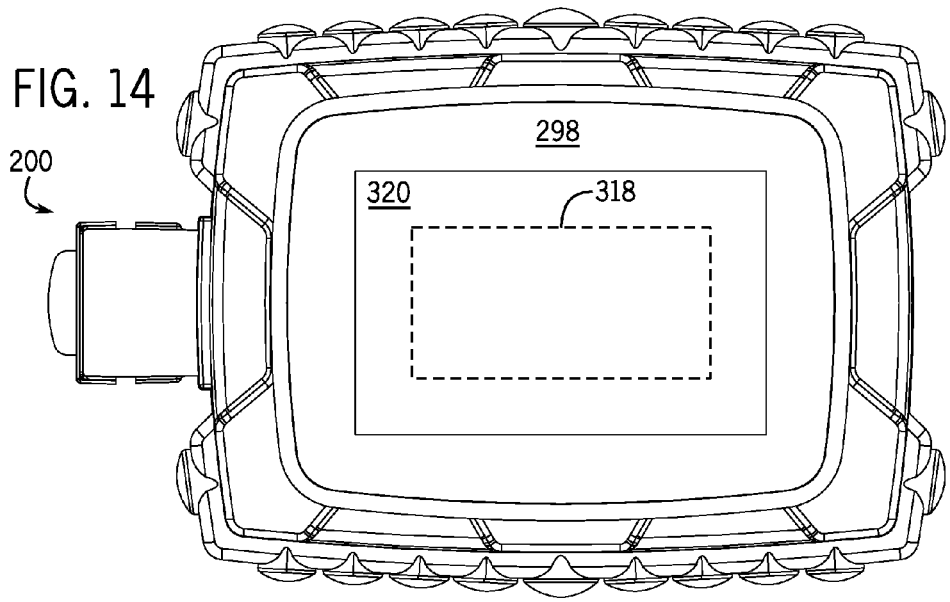
FIG. 14 is a bottom view of the wearable safety lighting apparatus of FIG. 5.
Figure 18:
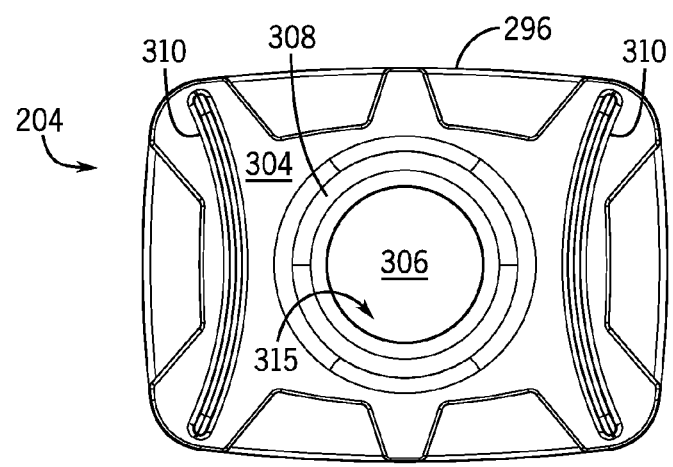
FIG. 18 is a top view of a mounting assembly of the wearable safety lighting apparatus of FIG. 5.

Top and bottom views of magnetic mounting assembly 204 are illustrated in FIG. 18 and FIG. 14, respectively. Elevational views of mounting assembly 204 are provided in FIGS. 9-12. Mounting assembly 204 includes a mounting plate 296. In one embodiment, the top surface 304 of mounting plate 296 may be constructed having a curvature that mirrors the curvature of the bottom surface 298. The bottom surface 298 of mounting plate 296 is contoured or curved downward to conform to a shoulder of a user, such as user 300 (FIG. 4). User 300 may be, for example a law enforcement officer, firefighter, medical personnel, military personnel, or security personnel, or work in the transportation or construction industries.

A pad 302, constructed of a compliant material such as foam or rubber, for example, is coupled to the bottom surface 298 of mounting plate 296. A magnet 306 is coupled to the top surface 304 of mounting plate 296. As shown, magnet 306 is engaged within a circular protrusion 308 extending outwardly from the top surface 304 of mounting plate 296 and is positioned to align with the magnet 290 coupled to main housing 206.

As shown in FIGS. 9-12, a pair of flanges 310 extends outwardly from top surface 304 of mounting plate 296. In one embodiment, the pair of flanges 310 curve inwardly along their lengths toward magnet 306 and are sized such that a top surface 312 of each of the flanges 310 extends above a top surface 315 of magnet 306, as shown in FIG. 15. The top surface 312 of flanges 310 may also be curved to mirror the curvature of the bottom surface 294 of lower housing portion 210, as shown in FIGS. 11 and 12. The curvature of flanges 310 increases the surface contact area of the mounting plate 296 with the bottom surface 294 of main housing 206 and improves stability of the wearable safety lighting apparatus 200 when worn by a user 300 (FIG. 4) by helping to prevent tipping or rocking of main light assembly 202 atop mounting assembly 204. The inward curvature of flanges 310 also provides a gripping surface on the mounting assembly 204 to aid a user in pulling the mounting assembly 204 away from the main light assembly 202.

A recess 316 or storage compartment is formed on the bottom surface 298 of mounting plate 296. Recess 316 is sized to receive a data card 318 having stored thereon personal data specific to the user 300. A protective cover 320 is provided to enclose data card 318 within recess 316. Protective cover 320 may be removeably attached to bottom surface 298 of mounting plate 296 via a hinge or one or more clips to permit access to and removal of data card 318.

The personal data provided on data card 318 may include, as non-limiting examples, information such as the user's name, age or birth date, photograph, emergency contact information, doctor information, blood type, medical history, current medications, and drug allergies, as non-limiting examples. In one embodiment, the personal data is printed on data card 318. In such an embodiment, data card 318 may be attached to bottom surface 298 with an adhesive or may be retained in place by way of a pressure fit between protective cover 320 and bottom surface 298.

In an alternative embodiment, data card 318 is an electronic storage device such as a flash drive or memory card having the personal data stored thereon. In an embodiment where data card 318 includes handwritten or typewritten data, protective cover 320 may be made of clear plastic to protect the data written on data card 318 from debris or moisture while permitting the personal data to be viewed when the device is removed from the user.

Magnet 290 and magnet 306 are retained within respective lower housing portion 210 and mounting plate 296 as shown in the cross-sectional view of FIG. 15. As illustrated, each magnet 290, 306 is constructed having a first section 322, a central section 324, and a second section 326. A first recessed lip 328 is formed about the circumference of the top surfaces 314, 315 of first section 322. First recessed lip 328 of magnet 290 is sized to engage a corresponding inner surface 330 of protrusion 292 so that magnet 290 is retained within upper housing portion 208. First recessed lip 329 of magnet 306 and is sized to engage a corresponding inner surface 336 of protrusion 308 so that magnet 306 is retained within lower housing portion 210. A second recessed lip 332 is formed about the circumference of the bottom surface 334 of second section 326

As shown in FIG. 15, the diameter 338 of the central sections 324 of magnet 290 and magnet 306 is greater than the diameter 340, 342 of respective first and second sections 322, 326. A first portion 344 of central section 324 adjacent lip 328 is constructed with sloped sides to permit magnets 290, 306 to be engaged by respective protrusions 292, 308. Once inserted, magnets 290, 306 are held in place by an interference fit between a second portion 346 of central section 324 and the respective side surfaces 348, 350 of protrusions 292, 308. The relative dimensions of the respective diameters of first, second, and central sections 322, 326, 324 of magnets 290, 306 are selected such that magnets 290, 306 are retained within lower housing portion 210 and mounting plate 296 when main housing 206 and magnetic mounting assembly 204 are pulled apart. That is, the diameter of respective central sections 324 is large enough so that magnets 290, 306 do not snap out of respective lower housing portion 210 or mounting plate 296 when main light assembly 202 is pulled apart from mounting assembly 204.

In one embodiment, magnet 290 is constructed having a north polarity at its top or outward-facing surface 314 and a south polarity at its bottom surface 334, while magnet 306 is constructed having a south polarity at its top or outward-facing surface 315 and a north polarity at its bottom surface 335. However, it is contemplated that the polarities may be reversed—that is the south pole of magnet 290 may be at top surface 314 while the north pole of magnet 306 may be at top surface 315. Magnets 290, 306 comprise a permanent magnet material such as, for example, neodymium iron boron. In one embodiment, the sizing and material of magnets 290, 306 are selected such that the attractive force between magnets 290, 306 is in a range of approximately 10-15 pounds.

Wearable safety lighting device 200 is secured to a user by positioning the magnetic mounting assembly 204 on the shoulder of the user underneath the shoulder portion of a piece of the user's clothing, such as a jacket for example. The main light assembly 202 is then positioned above the shoulder portion of the clothing in a location aligned with the magnetic mounting assembly 204. The magnetic attraction between magnets 290, 306 secures the wearable safety lighting device 200 to the user.

Magnet 290 may also be used to removeably couple main light assembly 202 to other metallic objects such as, for example, vehicle components and light components. Main light assembly 202 may thus be used apart from magnetic mounting assembly 204 to provide enhanced visibility of vehicles and to function as auxiliary light sources in low light areas such as natural disaster areas where power is lost or crime scenes, as examples.

Figure 6:
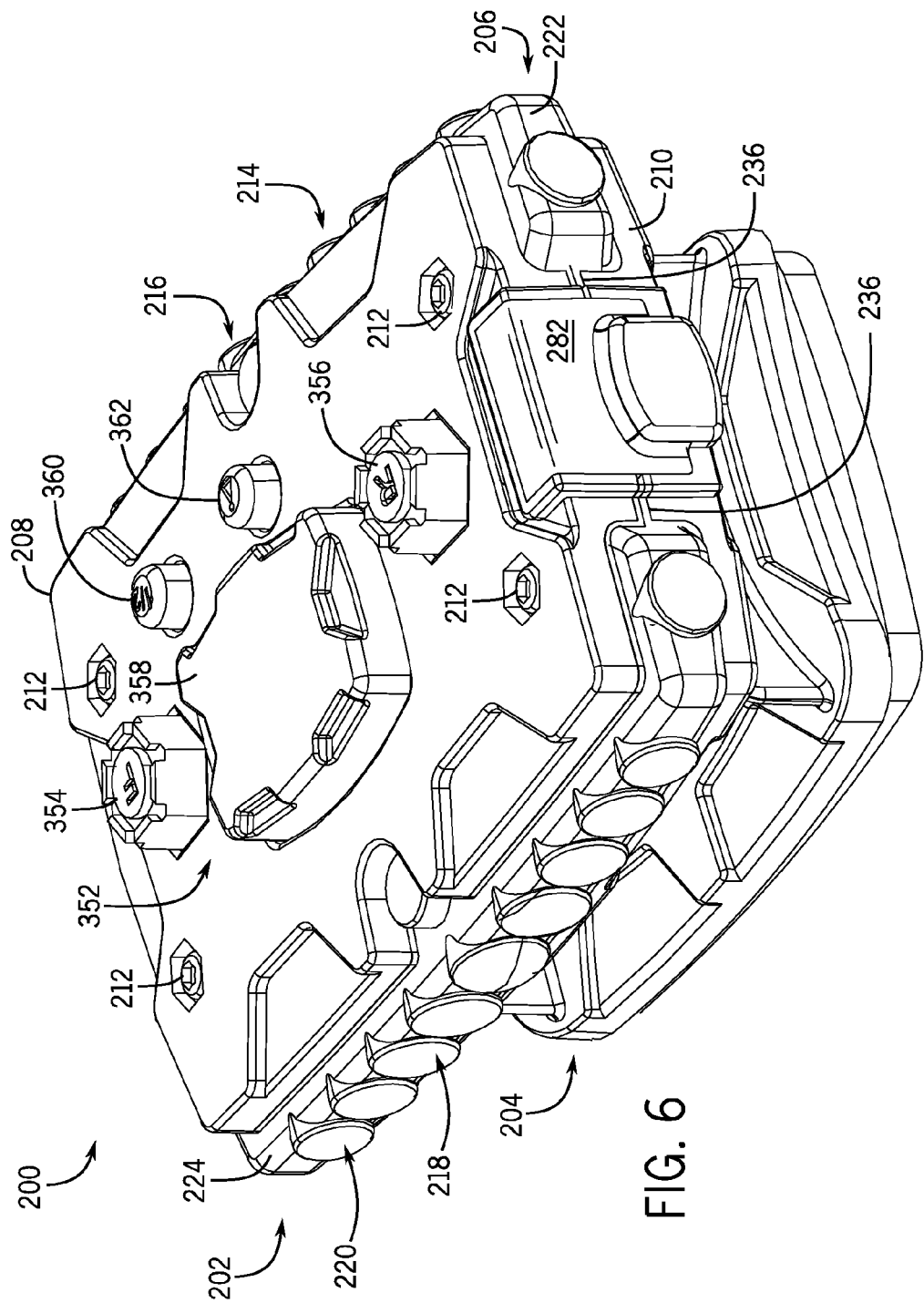
FIG. 6 illustrates a perspective view of the wearable safety lighting apparatus of FIG. 5.
Figure 7:
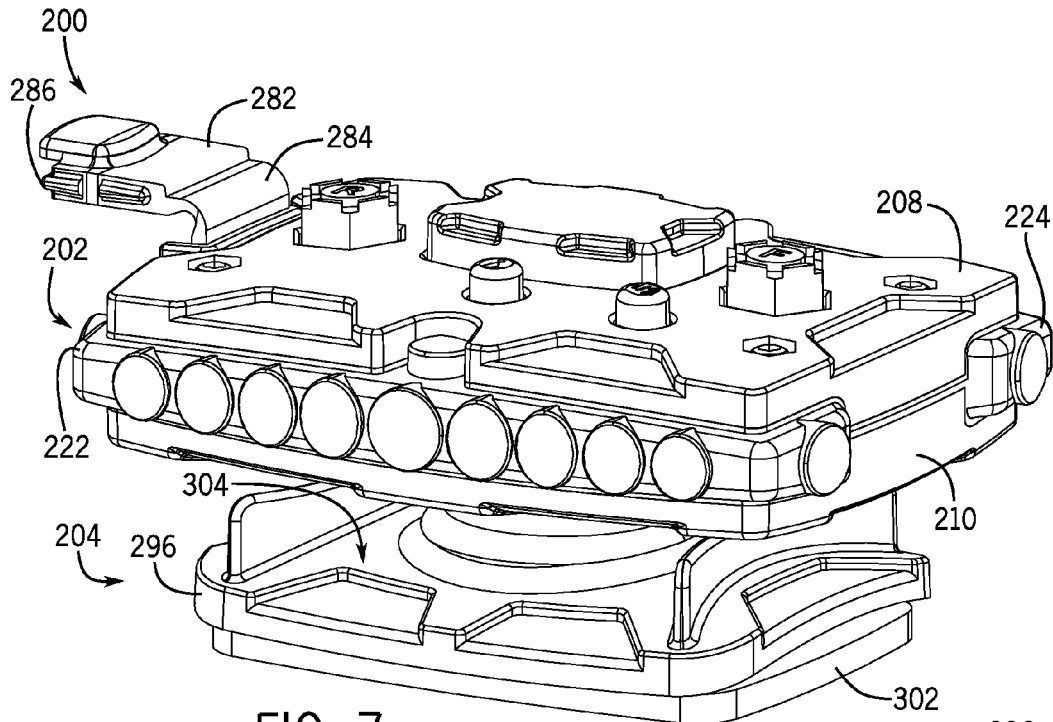
FIG. 7 is a front perspective view of the wearable safety lighting apparatus of FIG. 5.
Figure 8:
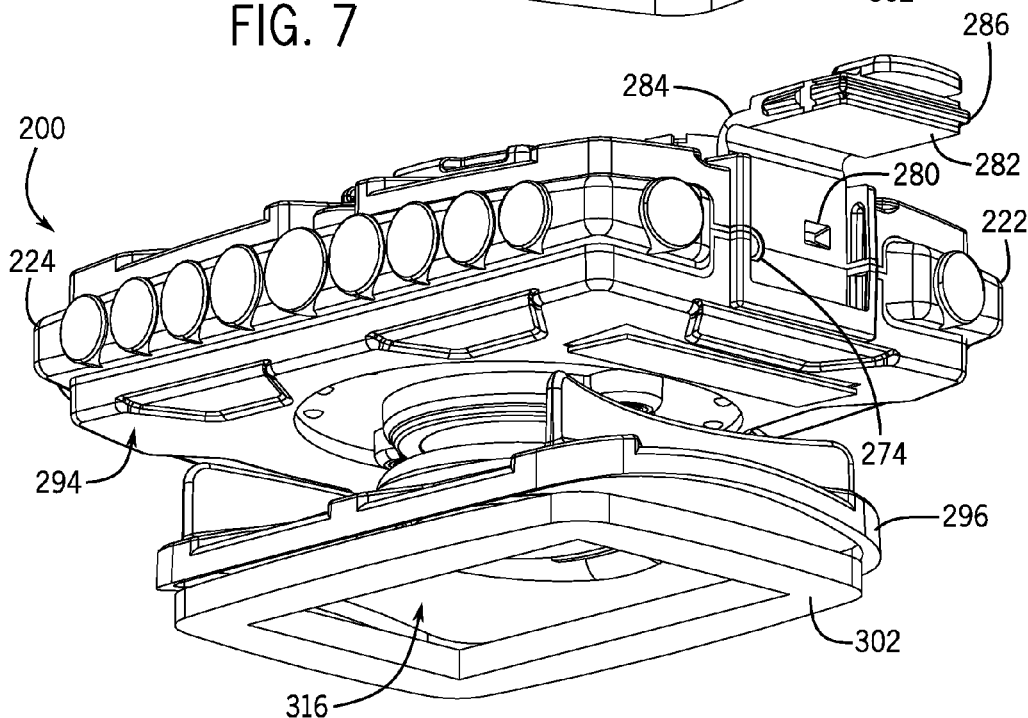
FIG. 8 is a rear perspective view of the wearable safety lighting apparatus of FIG. 5.

Referring now to FIG. 6 and FIG. 13 in particular, an arrangement of switches/control buttons 352 is provided on the upper housing portion 208 of main housing 206 to selectively control operation of light elements 226, 228. In particular, a front control button 354 is provided to control operation of light elements 226 and a rear control button 356 is provided to control operation of light elements 228. A center control button 358 selectively controls operation of light elements 226, 228, and beacon light elements 230, 232. Power saver button 360 selectively controls the intensity of any of light elements 226, 228, 234, 230, 232 that are energized when power saver button 360 is depressed. Operation of central light element 234 is controlled via a work light button 362.

As shown in FIG. 13, center control button 358 is provided in the center of upper housing portion 208 and is larger than buttons 354, 356, 360, 362. The larger sizing and central location of center control button 358 permits the user to easily access center control button 358 in an emergency situation and acts as an emergency override switch that activates the Emergency Mode of wearable safety lighting device 200, described in detail below.

In one embodiment, switches/buttons 354, 356, 358, 360, and 362 are constructed using a compliant or rubberized material and form a water tight seal against upper housing portion 208. Additional details regarding operation of buttons 354, 356, 358, 360, and 362 are provided in connection with the description of the schematic block diagram of FIG. 19.

Referring now to FIG. 19 and FIGS. 6-18 together where appropriate, operation of wearable safety lighting apparatus 200 is described with respect to the configuration of a controller element 364. In one embodiment, controller element 364 is a programmable unit provided within main housing 206. In an alternative embodiment, controller 364 is embodied as a hard-wired circuit board with similar functionality as a programmed device.

Figure 19:
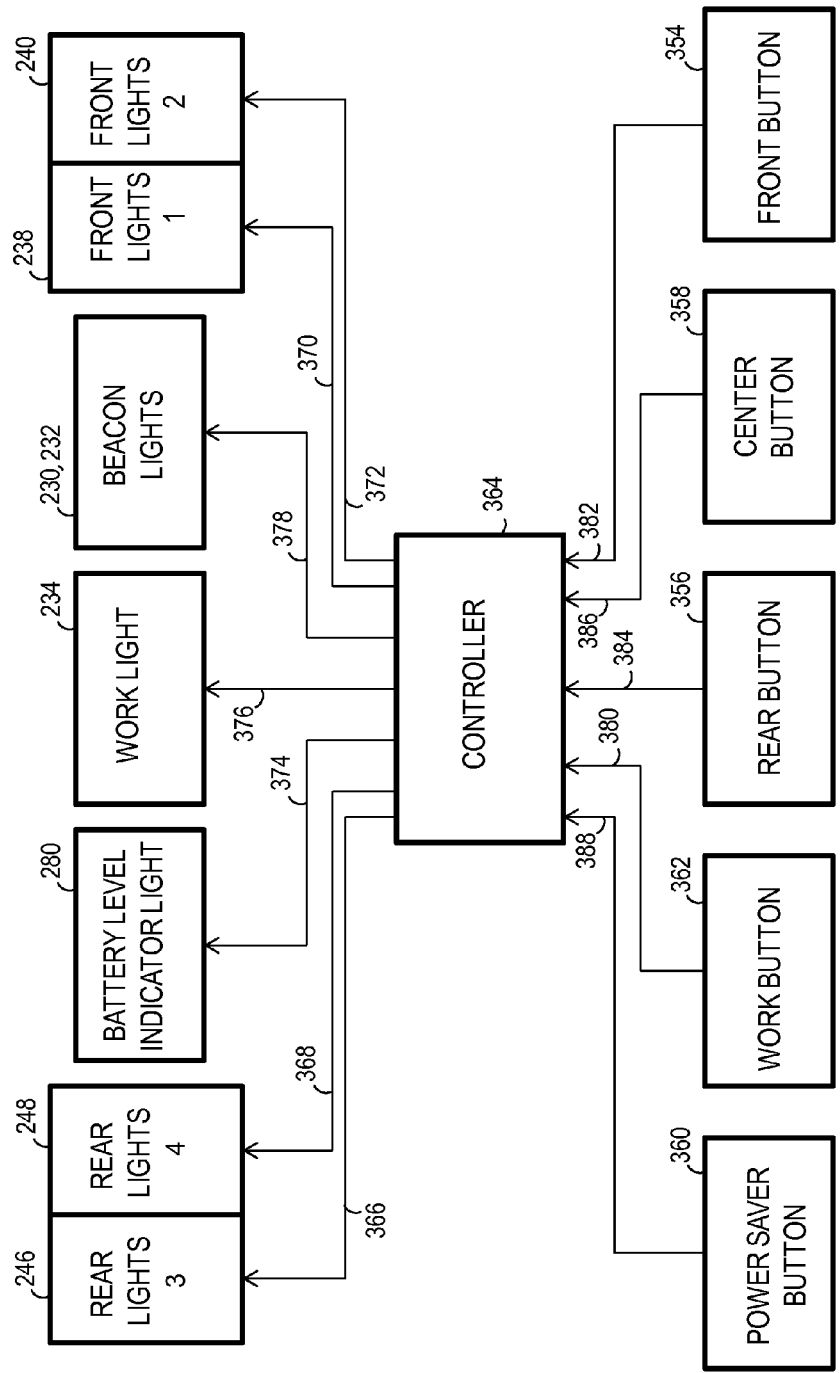
FIG. 19 is a schematic block diagram operation of the controller element of the wearable safety lighting apparatus of FIG. 5, according to one embodiment of the invention.

As shown in FIG. 19, controller element 364 is operationally coupled to the rearward-facing third and fourth groups of light elements 246, 248 via respective signal lines 366, 368, and to the frontward-facing first and second groups of light elements 238, 240 via respective signal lines 370, 372. Controller element 364 is likewise coupled to battery level light or charge indicator light 280 via signal line 374, to the work light or central light element 234 via signal line 376, and to the beacon lights 230, 232 via signal line 378. While one signal line 378 is shown for both beacon lights 230, 232, controller 364 may be coupled to each beacon light 230, 232 via an individual signal line in an alternative embodiment. Additional signal lines may also be provided in embodiments where it is desired to independently operate any side-facing light elements.

Controller element 364 is programmed to operate responsive to signals received upon activation or depression of power saver button 360, work light button 362, rear control button 356, center control button 358, and front control button 354. For example, upon depression of work light button 362, controller element 364 receives a signal via control line 380 and transmits a signal through signal line 376 to energize central light element 234. Upon depression of front control button 354, controller element 364 receives a signal via control line 382 and transmits a signal to energize front lights 238, 240 via respective signal lines 370, 372. Likewise, upon depression of rear control button 356, controller element 364 receives a signal via control line 384 and transmits a signal to energize rear lights 246, 248 through signal lines 366, 368.

In one embodiment, controller element 364 is programmed to control operation of front lights 238, 240 and rear lights 246, 248 in various Front & Rear Light Modes, wherein controller element 364 may selectively energize only the front lights 238, 240, only the rear lights 246, 248, or the front and rear lights 238, 240, 246, 248 simultaneously dependent upon the sequence in which the front and/or rear control buttons 354, 356 are depressed. As one non-limiting example, upon a first depression of front control button 354, controller element 364 may be programmed to transmit an energizing signal to front lights 238, 240 via signal lines 370, 372. If rear control button 356 is subsequently depressed, controller 364 may be programmed to transmit an energizing signal to rear lights 246, 248 via signal lines 366, 368. Following the sequence of depressing the front and rear control buttons 354, 356, front and rear lights 238, 240, 246, 248 would thus be energized. If either the front or rear control button 354, 356 was subsequently depressed, controller element 364 may be programmed to transmit a signal to de-energize either the front lights 238, 240 or rear lights 246, 248.

A law enforcement officer, for example, may wish to operate using only the rear lights 246, 248 to make himself visible to persons or vehicles behind him while approaching a subject or during a traffic stop. Front and rear lights 238, 240, 246, 248 may be energized to emit visual signals in a variety of colors, flashing patterns, or sequences as desired based on the given application.

When center control button 358 is depressed, a signal is transmitted to controller element 364 through control line 386 to operate in an Emergency Mode. Upon receipt of a signal from control line 386, controller element 364 transmits signals through signal lines 366, 368, 370, 372, 378 to simultaneously energize front lights 238, 240, rear lights 246, 248, and beacon lights 230, 232. In one embodiment, front lights 238, 240 and rear lights 246, 248 are energized according to the following sequential flashing pattern: front lights 240, rear lights 246, rear lights 248, and front lights 238, thereby creating a continuous chasing pattern of lights around main light assembly 202. Concurrently with this sequential flashing pattern, beacon lights 230, 232 are controlled to continuously flash ON and OFF. In another embodiment, upon receipt of a signal from control line 386, controller element 364 transmits signals to energize front lights 238, 240, rear lights 246, 248, and/or beacon lights 230, 232 and alternative alternating or random patterns. Central light element 234 may be separately activated by the user to emit a steady stream of light when operating in the Emergency Mode by depressing work light button 362.

In a preferred embodiment, controller element 364 is programmed to operate central light element 234 independently of front and rear lights 238, 240, 246, 248 and beacon lights 230, 232, thereby permitting a user to turn central light element 234 ON or OFF at any time, regardless of the current operating status of front and rear lights 238, 240, 246, 248 or beacon lights 230, 232. Further, in a preferred embodiment, controller element 364 is programmed to operate central light element 234 to emit a steady stream of light, while front and rear lights 238, 240, 246, 248 and beacon lights 230, 232 are controlled to emit light in a flashing pattern.

When power saver button 360 is depressed, a signal is transmitted via control line 388 to controller 364. Upon receipt of the signal from control line 388, controller element 364 transmits signals via signal lines 366-378 to reduce the operating power of any energized light elements 230, 232, 234, 238, 240, 246, 248, to extend the operating life of the wearable safety lighting apparatus 200. In one embodiment, the light output of any energized lights is decreased to a power consumption level equivalent to approximately one-half of the power consumption when the lights are operating at full intensity. Upon pressing power saver button 360 a second time, controller element 364 sends signals via appropriate signal lines to return any currently energized lights their maximum or full light intensity. In an alternative embodiment, controller element 364 may be configured to operate light elements initially operate light elements 230, 232, 234, 238, 240, 246, 248 at the reduced output level as a default and increase the output power to a full or maximum output level upon depression of power saver button 360.

Upon receiving a signal from any of control lines 380-388, controller element 364 is configured to transmit a signal via signal line 374 to energize battery level or charge indicator light 280. Embedded within the signal transmitted through signal line 374 is a color indicator for charge indicator light 280 based on a current state of charge of the power source 276. In one embodiment, controller element 364 is configured to monitor a current state of charge of power source 276 using one or more current or voltage sensors (not shown).

As described herein, a multi-directional, multi-functional wearable safety lighting apparatus provides a hands-free light source that provides a user with enhanced visibility. The wearable safety lighting apparatus is removeably coupleable to a user's apparel using a novel magnetic mounting mechanism that is contoured to a user's shoulder and that is provided with stability flanges to prevent the wearable safety lighting apparatus from tipping or rocking when the user moves. The wearable safety lighting apparatus is provided with multiple different light components that may be controlled to serve various functions, including providing flashlight functionality and enhancing the visibility of the user to others in heavily populated areas and during emergency situations.

A technical contribution for the disclosed apparatus is that it provides for a controller implemented technique for controlling light elements provided on a wearable safety lighting device.

Therefore, according to one embodiment of the invention, a wearable safety lighting device includes a main housing having a top surface, a bottom surface, and a plurality of side surfaces and a mounting assembly coupleable to the bottom surface of the main housing. The mounting assembly is configured to secure the wearable safety lighting device to a user. A first plurality of warning light elements is coupled to a front side surface of the main housing, a directional work light is coupled to the front side surface of the main housing and distinct from the first plurality of warning light elements, and a second plurality of warning light elements is coupled to a rear side surface of the main housing. A power source is configured to supply power to the first and second plurality of warning light elements and the directional work light and a controller is programmed to energize the first plurality of warning light elements following depression of a first control button, energize the second plurality of warning light elements following depression of a second control button, and energize the directional work light following depression of a third control button.

According to another embodiment of the invention, a wearable safety lighting apparatus includes a main light assembly having a rechargeable power source disposed within a housing and a first light assembly engaged between a top portion and a bottom portion of the housing, the first light assembly comprising a first plurality of light components and a work light component. The main light assembly also includes a second light assembly engaged between the top portion and the bottom portion of the housing, the second light assembly comprising a second plurality of light components. A plurality of switches are configured to selectively energize the first plurality of light components, the second plurality of light components, and the work light component to cause visual signals to emit therefrom and a first magnet coupled to the bottom portion of the housing. The wearable safety lighting apparatus also includes a mounting assembly comprising a second magnet positioned to align with the first magnet to secure the wearable safety lighting apparatus through clothing of a user.

According to yet another embodiment of the invention, a wearable safety lighting apparatus includes a multi-functional light assembly having a plurality of light components configured to emit visual signals in multiple directions and a first magnetic component secured to a bottom surface of the multifunctional light assembly. A mounting assembly is coupleable to the multi-functional light assembly via a second magnetic component secured to a top surface of the mounting assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wearable safety lighting device comprising:
    a main housing having a top surface, a bottom surface, and a plurality of side surfaces;
    a mounting assembly coupleable to the bottom surface of the main housing, the mounting assembly configured to secure the wearable safety lighting device to a user;
    a first plurality of warning light elements coupled to a front side surface of the main housing and disposed within a first light housing positioned between an upper housing portion and a lower housing portion of the main housing;
    a directional work light coupled to the front side surface of the main housing and distinct from the first plurality of warning light elements;
    a second plurality of warning light elements coupled to a rear side surface of the main housing and disposed within a second light housing, distinct from the first light housing, the second light housing positioned between the upper housing portion and the lower housing portion of the main housing;
    a first beacon light coupled to the top surface of the main housing and configured to emit visual signals in a direction facing outward from the top surface of the main housing, the first beacon light positioned within the first light housing;
    a second beacon light coupled to the top surface of the main housing and configured to emit visual signals in a direction facing outward from the top surface of the main housing, the second beacon light positioned within the second light housing;
    a power source configured to supply power to the first and second plurality of warning light elements, the directional work light, and the first and second beacon lights; and
    a controller programmed to:
        energize the first plurality of warning light elements following depression of a first control button;
        energize the second plurality of warning light elements following depression of a second control button;
        energize the directional work light following depression of a third control button; and
        energize the first beacon light, the second beacon light, the first plurality of warning light elements, and the second plurality of warning light elements following depression of a center control button.

2. The wearable safety lighting device of claim 1 wherein the directional work light comprises a light emitting diode (LED) having a first color;

wherein the first plurality of warning light elements comprise LEDs having a second color, different from the first color; and wherein the directional work light is positioned between a first subset of the first plurality of warning light elements and a second subset of the first plurality of warning light elements.

3. The wearable safety lighting device of claim 1 wherein the center control button is coupled to the top surface of the main housing; and wherein the controller is programmed to simultaneously or alternatively energize the first and second plurality of warning light elements and the first and second beacon lights upon depression of the center control button.

4. The wearable safety lighting device of claim 1 wherein the first light housing has a plurality of circular protrusions extending outwardly therefrom, the plurality of circular protrusions positioned to be aligned with respective locations of the first plurality of warning light elements, the directional work light, and the first beacon light.

5. The wearable safety lighting device of claim 1 further comprising a power safer button coupled to the top surface of the main housing; and wherein the controller is further programmed to adjust an intensity of at least one of the first plurality of warning light elements, the second plurality of warning light elements, and the directional work light element upon depression of the power saver button.

6. The wearable safety lighting device of claim 1 further comprising:
a first magnet positioned at the bottom surface of the main housing; and
a second magnet positioned at a top surface of the mounting assembly.

7. The wearable safety lighting device of claim 1 further comprising a plurality of curved flanges extending upward from the top surface of the mounting assembly.

8. The wearable safety lighting device of claim 1 further comprising a charge indicator light configured to display a current state of charge of a rechargeable power source disposed within the main housing.

9. The wearable safety lighting device of claim 1 further comprising a recording device.

10. The wearable safety lighting device of claim 1 further comprising a UPS component.

11. A wearable safety lighting apparatus comprising:
a main light assembly comprising:
a rechargeable power source disposed within a housing;
a first light assembly engaged between a top portion and a bottom portion of the housing, the first light assembly comprising a first plurality of light components, a first beacon light, and a work light component;
a second light assembly engaged between the top portion and the bottom portion of the housing, the second light assembly comprising a second plurality of light components, and a second beacon light;
a plurality of switches configured to selectively energize the first plurality of light components, the second plurality of light components, the first beacon light, the second beacon light and the work light component to cause visual signals to emit therefrom; and
a first magnet coupled to the bottom portion of the housing; and a mounting assembly comprising a second magnet positioned to align with the first magnet to secure the wearable safety lighting apparatus through clothing of a user;

wherein the mounting assembly further comprises a pair of flanges extending outwardly from a top surface of the mounting assembly; and wherein the second magnet is positioned between the pair of flanges.

12. The wearable safety lighting apparatus of claim 11 wherein the first light assembly comprises a translucent light housing having a plurality of circular protrusions formed thereon;

wherein the plurality of circular protrusions are aligned with respective light components of the first plurality of light components; and wherein one of the plurality of circular protrusions is formed on a to surface of the translucent light housing and is aligned with the first beacon light.

13. The wearable safety lighting apparatus of claim 12 wherein the controller element is configured to energize the work light component to emit a continuous visual signal while simultaneously energizing the first and second plurality of light components and the first and second beacon lights to emit a pattern of flashing visual signals.

14. The wearable safety lighting device of claim 11 further comprising a recording device.

15. The wearable safety lighting device of claim 11 further comprising a UPS component.

16. A wearable safety lighting apparatus comprising:
a multi-functional light assembly comprising:
a housing;
a first light assembly engaged between a top portion and a bottom portion of the housing, the first light assembly comprising a first plurality of light components, a first beacon light, and a work light component;
a second light assembly engaged between the top portion and the bottom portion of the housing, the second light assembly comprising a second plurality of light components, and a second beacon light; and
a first magnetic component secured to a bottom surface of the multifunctional light assembly; and
a mounting assembly coupleable to the multi-functional light assembly via a second magnetic component secured to a top surface of the mounting assembly;
wherein the first and second plurality of light components, the first and second beacon lights, and the work light are controlled by a plurality of switches connected to independently operate the first and second plurality of light components, the first and second beacon lights, and the work light in a plurality of subgroups; and
wherein one of the plurality of switches is an emergency override switch causing the plurality of subgroups to alternating operate.

17. The wearable safety lighting apparatus of claim 16 further comprising a pad coupled to the bottom surface of the mounting assembly; and wherein the bottom surface of the mounting assembly further comprises a curved surface to conform to a shoulder of a user.

18. The wearable safety lighting device of claim 16 further comprising a recording device.

19. The wearable safety lighting device of claim 16 further comprising a UPS component.

* * * * *

UNITED STATES PATENT AND TRADEMARK OFFICE
CERTIFICATE OF CORRECTION

PATENT NO.         : 9,478,108 B2                                               Page 1 of 1
APPLICATION NO.    : 14/295935
DATED              : October 25, 2016
INVENTOR(S)        : Kevin D. Matte, Ronald R. Dir and Chad J. Stillman It is certified that error appears in the above-identified patent and that said Letters Patent is hereby corrected as shown below:

In the Claims

Claim 5 at Column 15, Line 23 the term "safer" should be replaced with the term "saver."

Claim 10 at Column 15, Line 46 the term "UPS" should be replaced with the term "GPS."

Claim 15 at Column 16, Line 29 the term "UPS" should be replaced with the term "GPS."

Claim 19 at Column 16, Line 65 the term "UPS" should be replaced with the term "GPS."

Signed and Sealed this
Second Day of May, 2017

Michelle K. Lee
*Director of the United States Patent and Trademark Office*